April 6, 1965  L. E. DONAHUE  3,176,720
MOTORIZED VALVE
Filed Dec. 6, 1962
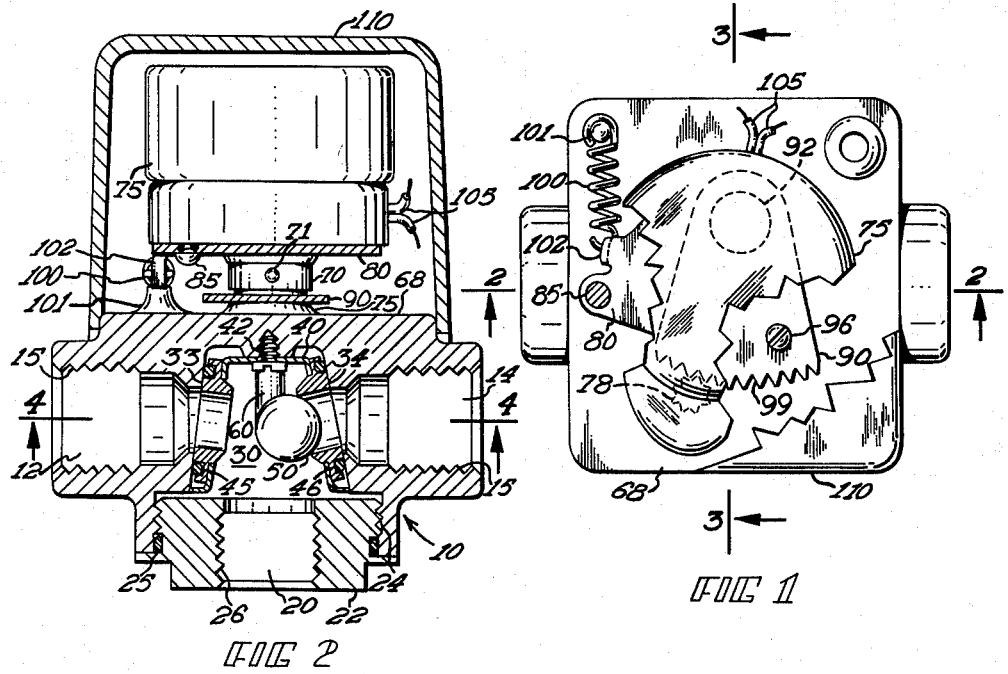
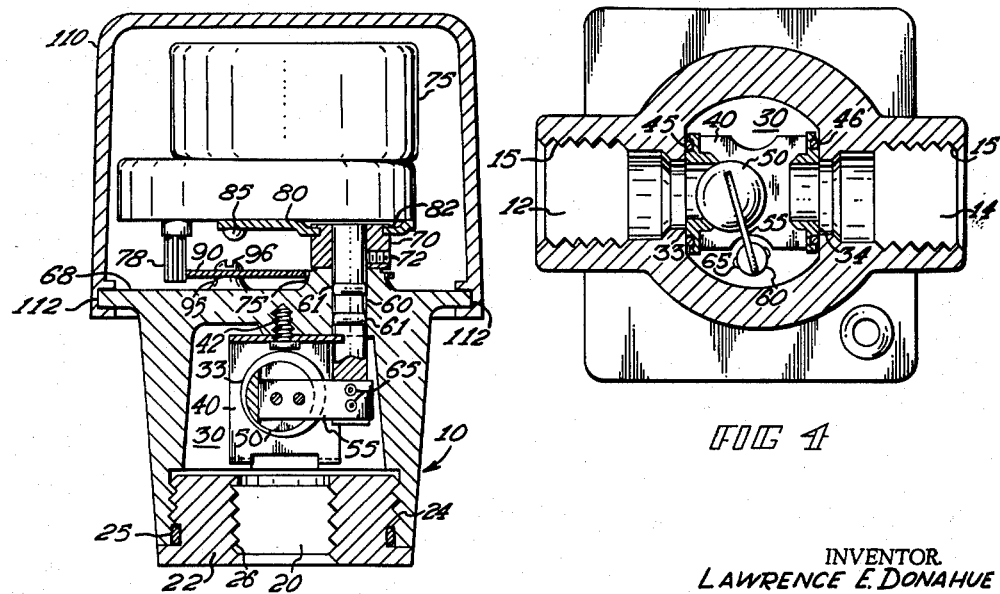
INVENTOR.
LAWRENCE E. DONAHUE
BY Joseph E. Ryan
ATTORNEY 3,176,720
MOTORIZED VALVE
Lawrence E. Donahue, Mount Prospect, Ill., assignor to Honeywell Inc., a corporation of Delaware
Filed Dec. 6, 1962, Ser. No. 242,688
8 Claims. (Cl. 137—625.44)

This invention relates to motor operated valves and more particularly to a small motorized valve of this type adapted for use in water valving operations such as air conditioning units.

Apparatus of this type is well known and highly developed with the result that continuous effort is directed toward the reduction in manufacturing cost of such a unit and the improved operation of the same. The present invention is specifically directed to a simplified valve design which is reliable in operation and economical to manufacture. It further provides an arrangement in which a simplified low-cost motor may be utilized to operate the valve which would require little or no maintenance since it inherently provides for positive seal off and wear take up.

It is therefore an object of this invention to provide an improved motor operated valve of this type which is inexpensive to manufacture and is reliable, smooth and quiet in operation.

Another object of this invention is to provide in a valve design of this type a simplified arrangement which eliminates critical alignment of parts and permits ready interchangeability of valve seats to permit different valve sizing with the same basic valve unit.

Still another object of this invention is to provide a simplified motorized valve utilizing floating valve seats which permit automatic wear take up and smooth valve operation and may be readily interchangeable as a two or three-way valve unit.

These and other objects of this invention will become apparent from a reading of the attached description together with the drawings wherein:

FIGURE 1 is a top view of the valve body with the driving motor thereon broken away in part to show the drive mechanism;

FIGURE 2 is a sectional view of the improved motorized valve in elevation taken along the lines 2—2 in FIGURE 1;

FIGURE 3 is a sectional view of the improved motorized valve in elevation taken along the lines 3—3 in FIGURE 1; and FIGURE 4 is a sectional view of the valve body taken along the lines 4—4 in FIGURE 2.

The improved motor operated valve design disclosed herein is shown in FIGURES 1-4 in a three-way valve version. It will be understood, however, that the apparatus may be converted to a two-way valve unit merely by closing one of the inlet ports, to be later identified, or if a straight through version is desired, the outlet port may be eliminated or closed and the seat on one of the inlet ports may be removed to make an outlet passage therethrough. Thus, as will be seen in the drawings, the improved valve design includes a valve body indicated generally at 10 having a pair of inlet ports 12 and 14 which are suitably threaded, as at 15, to provide for the connection of external piping thereto. The inlet ports are diametrically disposed in the valve body and an outlet port or passage 20 is included in the base of the valve body through a removable plug section 22 threaded into a tapped aperture 24 in the base of the valve body. Suitable sealing means, such as an O-ring 25, seals the plug to the valve body and the outlet port includes a tapped or threaded surface 26 for the purpose of external connections thereto. Internal of the valve body is a centrally located recess or chamber 30 to which the ports 12, 14 and 20 connect and in which are located a pair of floating valve seats 33, 34 respectively. The valve seats are adapted to be positioned adjacent to and against the surface of the inlet ports 12 and 14 and are held in position by means of a U-shaped spring or flexible mounting member 40 which is connected to the valve body at its mid-point through suitable mounting means such as a screw 42. The extremities of the mounting means or spring 40 have apertures therein which fit over the ends of the valve seats 33, 34 and bias them against the surface of the valve body adjacent the inlet ports 12 and 14. O-ring sealing means 45, 46 respectively are included between the surface of the seat and the valve body adjacent the port to seal the flow passage at this point. The flexible mounting means permits the valve seats 33, 34 to be centered or positioned against the force of the valve closure so that positive sealing is always obtained. This eliminates any requirement for accuracy in the location of the parts therein and prevents leakage with wear of the valve closure member which is indicated generally at 50. The valve closure member disclosed herein is substantially spherical in shape and is made of a soft pliant material such as rubber being mounted on a lever or arm 55 and suitably secured thereto (through means not shown).

The valve closure member or ball 50 is adapted to be pivoted between the diametrically opposed valve seats 33, 34 through an arcuate motion as imparted to the same through rotation of a shaft 60 which is mounted in the valve body 10 and suitably sealed therein through O-rings 61. The arm 55 is secured to the shaft 60 through the positioning of the shaft in a slotted portion thereof and securing the same through pins or suitable securing means 65. Rotational movement of the shaft 60 will cause the ball closure thereon to rotate until it engages one or the other of the valve seats 33, 34 at which points the movement is stopped by virtue of the resistance of the ball closure member against the seat. This improved motorized valve does not utilize any fixed stops and the small motive means, to be later identified, is of the type designed to be stalled while energized. Upon engagement of the ball closure member 50 with one or the other of the seats 33, 34, the seats which float by virtue of their mounting on the springs will be allowed to center over the valve closure member and be urged against the area of the body adjacent their respective port, at which point it will be sealed by virtue of the force or pressure applied between the valve seat and the body through the action of the sealing means 45. This arrangement permits a simplified valve design without requiring the accuracy in location of the valve parts. Further, the sizing of the valve, that is the flow area through the valve seat may be readily changed by insertion of a new valve seat in the spring clip 40 retaining the same to alter the capacity of the valve. This permits the design of a line of valves with different ratings and the interchangeability of parts without requiring special manufacture except for the details of the valve seat.

Shaft 60 operating the valve closure member extends beyond the upper surface 68 of the valve body which is generally rectangular in form and has secured thereto a connecting member 70 keyed to the same through suitable key or screw means 72. The valve body 10 on its upper surface has a raised hub portion indicated at 75 through which the shaft 60 extends and against which the connecting portion 70 on the shaft 60 abuts and moves as will be later defined.

The operating unit or the motor 75 is of the type which can be stalled without damage thereto so that no provision is made to automatically disengage the motor from the valve closure member 50 when the valve reaches its limit positions. The motor 75 is shown in block form as including a composite structure with its own gear train and an output pinion 78. Any form of motor may be utilized but a simple inexpensive motor of the clock drive type is preferable since its gearing permits a relative high torque output for the operation of the valve for the supply current required. Motor 75 is connected to the connecting member 70 on shaft 60 by virtue of a clamping bracket indicated generally at 80 which bracket has an opening therein to suitably fit over and connect to the irregular surface of the block or member 70 such as is indicated at 82 for mounting the motor on member 70. The bracket is screwed or secured to the motor housing through suitable connecting means indicated at 85. The mounting of the bracket 80 on the motor with the connecting member 70 thereon is all that is required for aligning the motor with the output shaft. Connecting member 70 contains suitable notches such as indicated in FIGURE 3 into which the irregular portions 82 of the bracket extend for positively positioning and connecting this portion of the apparatus. The bracket 80 is connected to the normal mounting holes of the motor through suitable connecting means and the entire motor assembly is designed to rotate with the shaft as will be hereinafter described.

Cooperating with the output pinion 78 of the motor is a gear plate or rack 90 which has an aperture 92 therein fitting over the hub portion 75 on the body through which the shaft 60 extends. The rack or gear plate 90 is also connected to a spacer or additional flange 95 on the upper surface 68 of the valve body through suitable connecting means such as a screw 96 as is best indicated in FIGURES 1 and 3. The geared or toothed periphery of the gear plate as indicated at 99 is designed to be positioned adjacent the pinion 78 and cooperate therewith such that the pinion will roll along the toothed periphery 99 of the gear plate rotating the entire motor and the connecting member 70 attached to the shaft 60 causing the operation of the valve parts.

As best indicated in FIGURES 1 and 2, the motor has also connected thereto a return spring indicated at 100 which spring is secured at one extremity to a boss or hub 101 on the surface 68 of the valve body 10 and connects at its other extremity to a flange or bracket portion 102 on the motor housing or the bracket 85 connected thereto. Thus the motor which is normally of the unidirectional type, such as a conventional clock motor, will rotate its output pinion 78 in one direction causing the motor to rotate in an opposite direction on the gear rack 90 rotating the shaft 60 of the motor and hence the valve closure member to cause the valve closure member to engage one or the other of the seats 33, 34. The return spring will become effective when the motor is de-energized to rotate the entire motor casing in the opposite direction rotating the shaft in the opposite direction and hence the valve closure member so that the valve closure member engages the opposite valve seat from that originally contacted performing the valving function of the conventional three-way valve. The electrical connections to the motor indicated generally at 105 are flexible and move with the motor so that the motor may be moved through the range of arcuate rotation indicated by the gear sector or plate 90 as best seen in FIGURE 2 or the distance between the valve seats 33, 34.

The entire motor is sealed or enclosed by a cover 110 which fits over side portions of the upper surface 68 of the base or valve body 10 and is retained thereon by means of a grooved section on two sides of the cover, such as indicated at 112, which clamp over or slide over the opposite surfaces of the valve body to retain the housing or cover thereon. Provision for extending electrical connections through the housing, such as an opening, is not shown since it is conventional.

In operation this improved motorized valve is conventional to the extent that energization of the motor will provide rotation of the valve in one direction to provide for valve closure against one of the valve seats against the restraint of the return spring 100. Upon de-energization of the motor, the return spring will rotate the motor casing and hence the output pinion across the rack rotating the shaft in the opposite direction and causing the opposite valve member to close and open the portion or valve member previously closed. Since the motor is of the type which may be stalled while energized without damage thereto, no stops are required or provided in the improved motorized valve design and the valve closure member in the energized or de-energized position will rest firmly against the valve seat centering the floating valve seat against the area adjacent the associated port to seal the same. Normally flow through the valve will be in such a direction as to aid in valve closure and sealing of the valve. Through this type of operation accuracy in the location and machining of parts within the valve body is not required since the positive mating of the valve closure member and seat is always provided through the action of the spring 40. In the three-way valve configuration shown herein, one or the other of the inlet ports 14, 15 will be connected to the outlet port and the direction of flow from the inlet port through the interior or chamber of the valve body 30 will always apply pressure against the valve closure member in such a direction as to aid in the seal off of the apparatus. Valve sizing may be readily changed by insertion of new valve seats through the removal of the outlet valve plugs 22 exposing the interior chamber 30 of the valve body and permitting removal of the spring 40 through the screw 42 to interchange parts. This permits the same valve body and motor to be utilized for different valve sizing. In addition, the positive engagement of the valve seat by the valve closure member with the ball type valve plug 50 will always insure positive seal off and automatic wear take up since the only stop will be the positive engagement of these parts either in the direction of motor energization or through spring return in the opposite direction.

A two-way version of this valve may be made without modification of the valve parts as shown in FIGURES 1, 2, 3 or 4 simply by applying a fixed plug (not shown) to one of the inlet ports and removing its associated seat or, if a straight through valve is desired, it will be arranged by providing a plug for the outlet port and removing one or the other of the associated inlet port seats to provide an outlet passage therethrough with an appropriate stop on either the gear sector or within the valve body (not shown) so the flow may extend around the valve closure member as it approaches the port area without the valve seat.

In the design of this motorized valve, a conventional motor unit is utilized of the type which is readily available and economical. Without modification it may be supplied with an additional mounting bracket which mounts through its mounting holes and a connecting member 70 to connect it to the drive shaft 60 of the valve. The key connection between the member 70 and the mounting bracket 80 need not be extremely accurate since the location of the motor will be governed basically by the permissible tolerance between the pinion 78 and the teeth 99 on the gear plate 90 with which the motor is associated. Thus the motor may be simply positioned on the valve for driving the same and its output transmitted through the entire motor assembly as the pinion rolls across the rack to operate the valve. A simple return spring is provided by attaching the same to the mounting bracket attached to the motor so that the device may be operated in the return direction upon de-energization of the motor in the conventional manner. This simplified design permits ease and economy in manufacture as well as simplicity in maintenance and substitution for parts.

In considering this invention it should be remembered that the present disclosure is intended to be illustrative only and the scope of the invention should be determined only by the appended claims.

I claim as my invention:

1. A motor operated valve comprising, a valve body having a plurality of inlet and outlet ports terminating in said valve body in a central recess, the inlet ports in said valve body being diametrically disposed therein, valve seats positioned over and adjacent each of said inlet ports, a U-shaped spring positioned within said recess of said valve body being secured thereto and engaging said valve seats thereby positioning the same over said valve ports, sealing means positioned between the seats and said valve ports, a spherical ball type closure member and a lever mounting the same positioned in said recess, said closure member being made of a soft pliant material and adapted to cooperate with said valve seats to selectively close the passage through the respective inlet ports, shaft means extending through said valve body and engaging said lever for mounting the same, said shaft means being journalled in and being sealed within said valve body and adapted to pivot said lever with said valve closure member thereon between said diametrically disposed valve seats, motor means mounted on said shaft and movable therewith, said motor means including an output pinion, a gear rack fixed to said valve body external of said recess and adapted to be engaged by said pinion to cause said motor to move relative to said rack upon rotation of said motor pinion thereby rotating said shaft with said lever attached thereto to move said valve closure member between said diametrically disposed valve seats, and a return spring mounted on said valve body and connected to said motor.

2. A motor operated valve comprising, a valve body having a plurality of inlet and outlet ports terminating in said valve body in a central recess, the inlet ports in said valve body being diametrically disposed therein, valve seats positioned over and adjacent each of said inlet ports, a U-shaped spring positioned within said recess of said valve body being secured thereto and engaging said valve seats thereby positioning the same over said valve ports, sealing means positioned between the seats and said valve ports, a spherical ball type closure member and a lever mounting the same positioned in said recess, said closure member being made of a soft pliant material and adapted to cooperate with said valve seats to selectively close the passage through the respective inlet ports, shaft means extending through said valve body and engaging said lever for mounting the same, said shaft means being journalled in and being sealed within said valve body and adapted to pivot said lever with said valve closure member thereon between said diametrically disposed valve seats, and motor means connected in part to said shaft and in part to said valve body for pivoting said shaft and opening and closing said valve.

3. A motor operated valve comprising, a valve body having a plurality of inlet and outlet ports terminating in said valve body in a central recess, the inlet ports in said valve body being diametrically disposed therein, valve seats positioned over and adjacent each of said inlet ports, a flexible mounting means positioned within said recess of said valve body being secured thereto and engaging said valve seats to position the same over said valve ports, sealing means positioned between the seats in said valve ports, a valve closure member and a lever mounting the same positioned in said recess, said closure member being made of a soft pliant material and adapted to cooperate with said valve seats to selectively close the passage through the respective inlet ports, shaft means extending through said valve body and engaging said lever for mounting the same, said shaft means being journalled in and being sealed within said valve body and adapted to pivot said lever with said valve closure member thereon between said diametrically disposed valve seats, motor means mounted on said shaft and movable therewith, said motor means including an output pinion, a gear rack fixed to said valve body external of said recess and adapted to be engaged by said pinion to cause said motor to move relative to said rack upon rotation of said motor pinion thereby rotating said shaft with said lever attached thereto to move said valve closure member between said diametrically disposed valve seats, and a return spring mounted on said valve body and connected to said motor.

4. A motor operated valve comprising, a valve body having a plurality of inlet and outlet ports terminating in said valve body in a central recess, the inlet ports in said valve body being diametrically disposed therein, valve seats positioned over and adjacent each of said inlet ports, a flexible mounting means positioned within said recess of said valve body being secured thereto and engaging said valve seats to position the same over said valve ports, sealing means positioned between the seats and said valve ports, a valve closure member and a lever mounting the same positioned in said recess, said closure member being made of a soft pliant material and adapted to cooperate with said valve seats to selectively close the passage through the respective inlet ports, shaft means extending through said valve body and engaging said lever for mounting the same, said shaft means being journalled in and being sealed within said valve body and adapted to pivot said lever with said valve closure member thereon between said diametrically disposed valve seats, and motor means connected in part to said shaft and in part to said valve body for pivoting said shaft and opening and closing said valve.

5. A motor operated valve comprising, a valve body having a plurality of inlet and outlet ports terminating in said valve body in a central recess, the inlet ports in said valve body being spaced apart therein, valve seats positioned over and adjacent each of said inlet ports, a U-shaped spring positioned within said recess of said valve body being secured thereto and engaging said valve seats thereby positioning the same over said valve ports, a spherical ball type closure member and a lever mounting the same positioned in said recess, said closure member being adapted to cooperate with said valve seats to selectively close the passage through the respective inlet ports, shaft means extending through said valve body and engaging said lever for mounting the same, said shaft means being adapted to pivot said lever with said valve closure member thereon between said spaced valve seats, motor means mounted on said shaft and movable therewith, said motor means including an output pinion, a gear rack fixed to said valve body external of said recess and adapted to be engaged by said pinion to cause said motor to move relative to said rack upon rotation of said motor pinion thereby rotating said shaft with said lever attached thereto to move said valve closure member between said spaced valve seats, and a return spring mounted on said valve body and connected to said motor.

6. A motor operated valve comprising, a valve body having a plurality of inlet and outlet ports terminating in said valve body in a central recess, the inlet ports in said valve body being spaced apart therein, valve seats positioned over and adjacent each of said inlet ports, a U-shaped spring positioned within said recess of said valve body being secured thereto and engaging said valve seats thereby positioning the same over said valve ports, a spherical ball type closure member and a lever mounting the same positioned in said recess, said closure member being adapted to cooperate with said valve seats to selectively close the passage through the respective inlet ports, shaft means extending through said valve body and engaging said lever for mounting the same, said shaft means being journalled in and sealed within said valve body and adapted to pivot said lever with said valve closure member thereon between said spaced valve seats, and motor means connected in part to said shaft and in part to said valve body for pivoting said shaft and opening and closing said valve.

7. A motor operated valve comprising, a valve body having a plurality of inlet and outlet ports terminating in said valve body in a central recess, the inlet ports in said valve body being spaced apart therein, valve seats positioned over and adjacent each of said inlet ports, a flexible mounting means positioned within said recess of said valve body being secured thereto and engaging said valve seats to position the same over said valve ports, a valve closure member and a lever mounting the same positioned in said recess, said closure member being adapted to cooperate with said valve seats to selectively close the passage through the respective inlet ports, shaft means extending through said valve body and engaging said lever mounting the same, said shaft means being journalled in said valve body and adapted to pivot said lever with said valve closure member thereon between said spaced valve seats, motor means mounted on said shaft and movable therewith, said motor means including an output pinion, a gear rack fixed to said valve body external of said recess and adapted to be engaged by said pinion to cause said motor to move relative to said rack upon rotation of said motor pinion thereby rotating said shaft with said lever attached thereto to move said valve closure member between said spaced valve seats, and a return spring mounted on said valve body and connected to said motor.

8. A motor operated valve comprising, a valve body having a plurality of inlet and outlet ports terminating in said valve body in a central recess, the inlet ports in said valve body being spaced apart therein, valve seats positioned over and adjacent each of said inlet ports, a flexible mounting means positioned within said recess of said valve body being secured thereto and engaging said valve seats to position the same over said valve ports, a valve closure member and a lever mounting the same positioned in said recess, said closure member being adapted to cooperate with said valve seats to selectively close the passage through the respective inlet ports, shaft means extending through said valve body and engaging said lever for mounting the same, said shaft means being journalled in said valve body and adapted to pivot said lever with said valve closure member thereon between said spaced valve seats, and motor means connected in part to said shaft and in part to said valve body for pivoting said shaft and opening and closing said valve.

References Cited by the Examiner

UNITED STATES PATENTS

| | | | |
|---|---|---|---|
| 260,490 | 7/82 | Martin | 137—625.44 |
| 290,314 | 12/83 | Blessing | 251—362 XR |
| 1,038,060 | 9/12 | Zint | 251—298 X |
| 1,642,391 | 9/27 | Thiel | 251—134 |
| 2,694,414 | 11/54 | Seyferth | 137—625.44 |

FOREIGN PATENTS

| | | |
|---|---|---|
| 19,745 | 1903 | Great Britain. |
| 337,322 | 10/30 | Great Britain. |

M. CARY NELSON, *Primary Examiner.*

LAVERNE D. GEIGER, MARTIN P. SCHWADRON,
*Examiners.*